US011031791B2

(12) United States Patent
Castagna et al.

(10) Patent No.: US 11,031,791 B2
(45) Date of Patent: Jun. 8, 2021

(54) ELECTRONIC ADJUSTING DEVICE FOR ELECTRIC ENERGY STORING APPARATUS OF THE TYPE PROVIDED WITH BATTERIES

(71) Applicant: Genport S.R.L., Vimercate (IT)

(72) Inventors: Walter Castagna, Civate (IT); Paolo Barile, Milan (IT); Stefano Limonta, Concorezzo (IT); Paolo Fracas, Lecco (IT)

(73) Assignee: Genport S.R.L., Vimercate (IT)

( * ) Notice: Subject to any disclaimer, the term of this patent is extended or adjusted under 35 U.S.C. 154(b) by 389 days.

(21) Appl. No.: 16/063,368

(22) PCT Filed: Jan. 11, 2017

(86) PCT No.: PCT/EP2017/050454
§ 371 (c)(1),
(2) Date: Jun. 18, 2018

(87) PCT Pub. No.: WO2017/121745
PCT Pub. Date: Jul. 20, 2017

(65) Prior Publication Data
US 2018/0366956 A1    Dec. 20, 2018

(30) Foreign Application Priority Data

Jan. 13, 2016    (IT) .................... 102016000002586

(51) Int. Cl.
*H02J 7/00*    (2006.01)
(52) U.S. Cl.
CPC .......... *H02J 7/0014* (2013.01); *H02J 7/0013* (2013.01)

(58) Field of Classification Search
USPC ......................................... 320/116–119, 121
See application file for complete search history.

(56) References Cited

U.S. PATENT DOCUMENTS

| 6,208,039 B1* | 3/2001 | Mendelsohn | ......... H02J 7/0024 |
| | | | 307/52 |
| 7,589,498 B2* | 9/2009 | Choy | ...................... H02J 1/102 |
| | | | 320/119 |
| 2012/0112701 A1 | 5/2012 | Ito et al. | |
| 2012/0319657 A1* | 12/2012 | Ke | ........................ H02J 7/0021 |
| | | | 320/134 |

(Continued)

FOREIGN PATENT DOCUMENTS

| EP | 2408053 A2 | 1/2012 |
| EP | 2899556 A1 | 7/2015 |

OTHER PUBLICATIONS

International Search Report and Written Opinion for PCT/EP2017/050454 dated Jan. 11, 2017; 12 pps.

*Primary Examiner* — Samuel Berhanu
(74) *Attorney, Agent, or Firm* — RowanTree Law Group, PLLC; Carson C.K. Fincham (57) ABSTRACT

An electronic adjusting device (1) for an electric energy storing apparatus (100) of the type provided with batteries, said storing apparatus comprising a plurality of battery modules (10) electrically connectable with an electric load, said electronic adjusting device comprising a plurality of electronic adjusting units (2), each comprised in a corresponding battery module (10) to adjust the feeding current (IL) provided by the cells (11) of the said battery module to said electric load.

12 Claims, 3 Drawing Sheets

(56) References Cited

U.S. PATENT DOCUMENTS

| | | | |
|---|---|---|---|
| 2013/0049472 A1* | 2/2013 | Tinglow | H02J 7/0016 |
| | | | 307/65 |
| 2013/0181513 A1 | 7/2013 | Yano | |
| 2014/0239964 A1* | 8/2014 | Gach | G01R 31/36 |
| | | | 324/433 |
| 2017/0256825 A1* | 9/2017 | Sun | H02J 7/0021 |
| 2017/0358936 A1* | 12/2017 | Kang | H01M 2/206 |

* cited by examiner

ELECTRONIC ADJUSTING DEVICE FOR ELECTRIC ENERGY STORING APPARATUS OF THE TYPE PROVIDED WITH BATTERIES

CROSS-REFERENCE TO RELATED APPLICATIONS

The present application is a U.S. National Phase 35 U.S.C. § 371 Application based on International Patent Application No. PCT/EP2017/050454 filed on Jan. 11, 2017 and published as WO/2017121745A1 on Jul. 20, 2017, which claims benefit and priority to Italian Patent Application No. 102016000002586 filed on Jan. 13, 2016.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR OR A JOINT INVENTOR

Not Applicable

BACKGROUND OF THE INVENTION

1. Field of the Invention

The present invention relates to the field of electric energy storing apparatus of the type provided with batteries.

More in particular, the present invention relates to an electronic adjusting device for electric energy storing apparatus with batteries that allows rapid and effective balancing of the feeding currents supplied to an electric load by the battery modules.

There are known numerous examples of electric energy storing apparatus for use in electric systems, either isolated or connected to the electric power network.

Among these, electric energy storing apparatus of the type provided with batteries are widely used.

An electric energy storing apparatus with batteries typically comprises a plurality of battery modules electrically connected to one another in series and/or in parallel and connectable, as a whole, with an electric load to feed this latter. Each battery module generally comprises a plurality of cells electrically connected in series and/or in parallel.

As is known, when a storing apparatus with batteries is electrically connected to an electric load, it is desirable for the currents supplied to the electric load by the battery modules to have the same or very similar intensity.

Unfortunately, the electric impedance (internal and of the electric connections) and the storing capacity of the battery modules are subject to variations linked to differences in construction, installation and/or operation.

Generally, this makes it impossible to obtain a natural balancing of the feeding currents supplied by the battery modules and, consequently, a uniform discharge process of the cells, resulting in a decrease in the total electric energy storing capacity and in the maximum current that can be supplied to the electric load.

Moreover, as amply demonstrated by experience in the field, in some circumstances the lack of balance of the feeding currents supplied can rapidly lead to interruptions in the operation of the battery modules.

In order to overcome the problems indicated above, many electric energy storing apparatus of the type provided with batteries are provided with electronic devices for adjusting the feeding currents supplied by the battery modules.

2. Description of Related Art Including Information Disclosed Under 37 CFR 1.97 and 1.98

The patent application US2005/0275372A1 describes an electronic adjusting device that allows balancing of the currents supplied by disconnecting from the electric load, time by time, the battery module that has a too high a charge with respect to the other battery modules. The U.S. Pat. No. 6,208,039 describes an electronic adjusting device that comprises, according to control architecture of "master-slave" type, a centralized control unit intended to provide control signals for a plurality of DC/DC converter circuits, each of which is on a battery module to adjust the current it supplies to the electric load.

The U.S. Pat. No. 7,589,498 describes an electronic adjusting device that comprises, again according to control architecture of "master-slave" type, a centralized control unit intended to provide multiple reference signals for adjusting units on the battery modules. Each adjusting unit comprises a plurality of control loops concurrent with one another to adjust the current supplied to the electric load by the corresponding battery module.

The patent application US2012/112701A1 describes a further example of electronic adjusting device of the state of the art.

BRIEF SUMMARY OF THE INVENTION

In general, the prior art solutions, illustrated above, have limits in terms of effectiveness and/or promptness in the adjustment dynamics of the currents supplied to the electric load that are not negligible.

Moreover, these solutions are characterized by structures that are relatively complex to produce in practice with high manufacturing costs that have a significant influence on the total industrial costs of the electric energy storing apparatus.

The main task of the present invention is to provide an electronic adjusting device for electric energy storing apparatus of the type provided with batteries that allows the aforesaid problems to be solved and overcome.

Within this task, an object of the present invention is to provide an electronic adjusting device that makes it possible to obtain rapid and effective balancing of the currents supplied to the electric load by the battery modules.

A further object of the present invention is to provide an electronic adjusting device that is particularly reliable, has a particularly simple structure and that is easy to manufacture on an industrial scale, at competitive prices with respect to conventional adjusting devices.

This task and these objects, together with other objects that will be more apparent from the subsequent description and from the accompanying drawings, are achieved, according to the invention, by an electronic adjusting device for electric energy storing apparatus of the type provided with batteries, according to claim 1 below and to the related dependent claims.

In a further aspect thereof, the present invention relates to an electric energy storing apparatus, according to claim 11 below and to the related dependent claims.

BRIEF DESCRIPTION OF THE SEVERAL VIEWS OF THE DRAWING(S)

Characteristics and advantages of the present invention will become more apparent with reference to the description given below and to the accompanying figures, wherein.

DETAILED DESCRIPTION OF THE INVENTION

With reference to the cited figures, the present invention relates to an electronic adjusting device 1 for an electric energy storing apparatus 100 of the type provided with batteries.

The storing apparatus 100 comprises a plurality of battery modules 10 electrically connectable with an electric load (not illustrated) to provide this latter with electric power.

In general, the number of battery modules 10 of the apparatus 100 can be any, according to needs. By way of example, FIG. 1 shows an apparatus 100 comprising N (N>=2) battery modules connected in parallel to one another.

In some embodiments, however, the apparatus 100 can comprise a plurality of battery modules 10 connected to one another in a different way than illustrated, for example in series. Preferably, each battery module 10 is connected to a pair of output terminals OUT+, OUT−, at which it is electrically connectable with the electric load to feed this latter, and to a pair of input terminals IN+, IN−, at which it is electrically connectable with an electric power source for charging.

Figure 1:
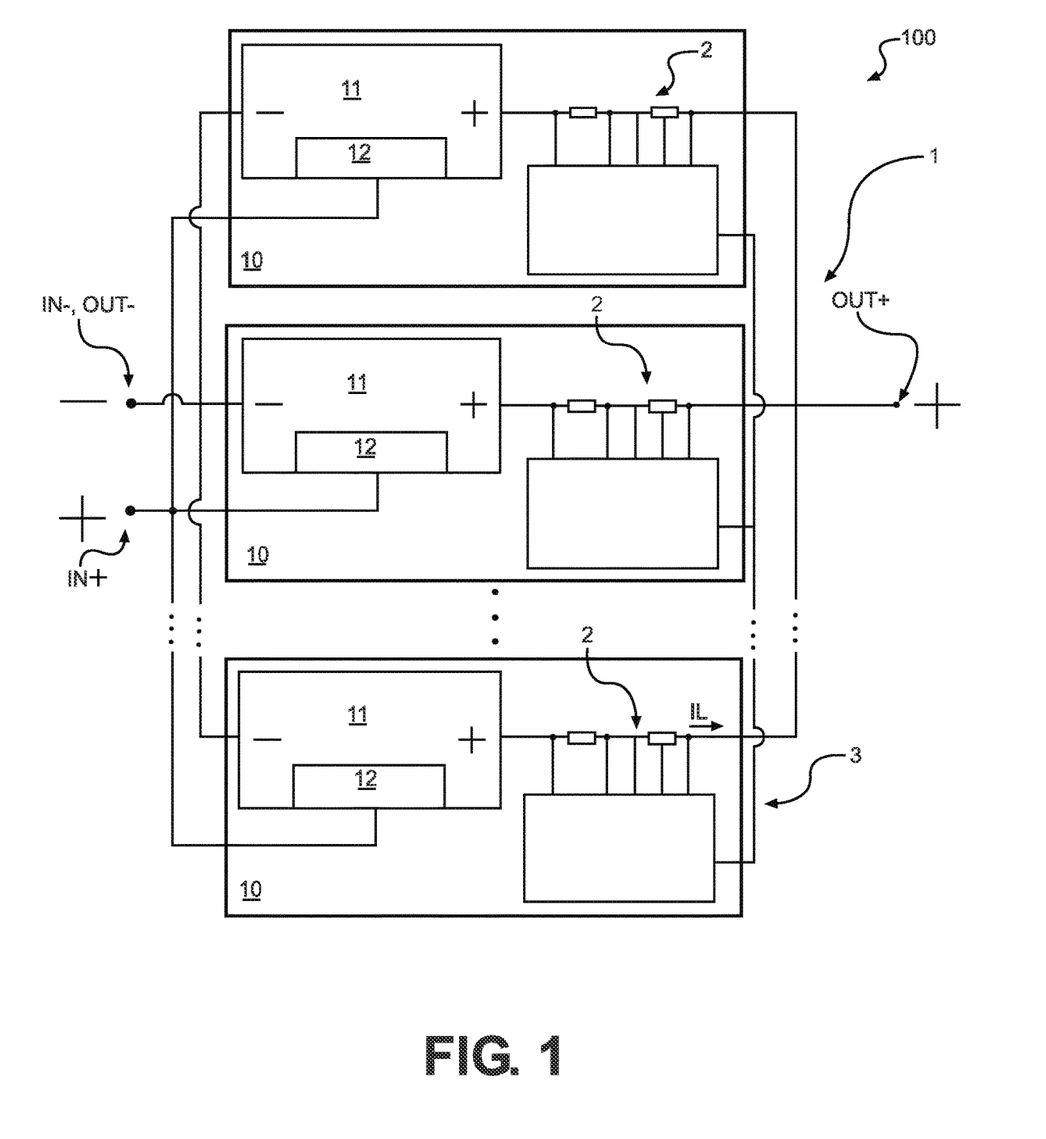
FIG. 1 schematically illustrates an electric energy storing apparatus with batteries comprising an electronic adjusting device according to the present invention.

In some embodiments of the apparatus 100, as illustrated in FIG. 1, the pairs of input terminals IN+, IN− and output terminals OUT+, OUT− of each battery module 10 can have a common terminal, for example the ground potential terminal.

Each battery module 10 advantageously comprises one or more cells 11 electrically connected to one another in series or in parallel.

The cells 11 can be of the lead-acid, nickel-cadmium, sodium-sulfur, nickel-metal hydride, sodium-metal chloride, redox, iron-ion, aluminum-ion or sodium-ion type and the like.

Preferably, the cells 11 are of lithium-ion type.

Preferably, each battery module 10 comprises an electronic control device 12 adapted to manage operation of the related cells 11.

The electronic control device 12 is adapted to implement functions of detecting and managing the state of charge of the cells 11, protective functions (such as from over-voltages, over-currents, over-temperatures and the like), communication functions with any other electronic devices of higher level, or the like.

An example of construction of a battery module 10 can be represented by a "smart battery pack" known with the trade name GENIOL™ 460. This battery module is provided with four groups of cells connected to one another in series. Each group of cells is in turn formed of 6 cells connected to one another in parallel. This battery module can, for example, have a rated storage capacity of 20-40 Ah, a rated voltage of 10-15 V and a rated discharge current of 10-30 A.

According to the invention, the apparatus 100 comprises an electronic adjusting device 1 adapted to adjust the feeding current supplied to the electric load by the battery modules 10.

The electronic adjusting device 1 comprises a plurality of electronic adjusting units 2.

Each electronic adjusting unit 2 is comprised in a corresponding battery module 10 and is adapted to adjust the feeding current IL provided to the electric load by the cells 11 of the corresponding battery module.

By way of example, each electronic unit 2 can be integrated in a circuit board together with the electronic control device 12 and positioned, together with the cells 11, inside a protective enclosure of the corresponding battery module 10.

Preferably, the electronic device 1 comprises an electronic adjusting unit 2 for each battery module 10 comprised in the apparatus 100.

In some embodiments of the invention, however, the electronic device 1 could comprise a total number of electronic adjusting units lower than the total number of battery modules 10 present in the apparatus 100.

In general, the relation 2<=M<=N is valid, where N and M are respectively the number of battery modules 10 and the number of electronic adjusting units 2 present in the apparatus 100.

The electronic device 1 comprises an electronic bus 3 connected in parallel to the electronic adjusting units 2 to allow communication between these latter.

In particular, the electronic bus 3 is adapted to make available a bus signal VBUS to the electronic adjusting units 2.

The bus signal VBUS is indicative of a minimum feeding current provided to the electric load by the battery modules of the apparatus 100.

For clarity, it is specified that the term "minimum feeding current" identifies the feeding current provided to the electric load by one of the battery modules of the apparatus 100 when this feeding current is lower than the feeding currents provided by the other battery modules. Naturally, the bus signal VBUS can vary in time as a function of the operating status of the various battery modules of the apparatus 100.

In fact, the feeding current provided by any battery module of the apparatus 100 can vary according to the state of charge and any variations in the electric impedance of the related cells and of the related electric connections.

This means that the minimum feeding current value provided to the electric load can vary in time, as can the battery module that supplies this minimum feeding current.

According to the invention, each electronic adjusting unit 2 comprises a first electronic stage 21 arranged so as receive the bus signal VBUS and a first detection signal S1.

The detection signal S1 is indicative of the feeding current IL provided to the electric load by the cells 11 of the corresponding battery module 10.

The electronic stage 21 is configured so as to process the input bus signal VBUS and the input detection signal S1 received, and to provide a new bus signal VBUS modified to make it available, through the electronic bus 3, to the electronic adjusting units 2.

The modified bus signal VBUS is provided by the electronic stage 21 only in the case in which the feeding current IL, provided by the cells 11 of the corresponding battery module 10, is lower than the aforesaid minimum feeding current.

In other words, the electronic stage 21 is configured so as to provide a bus signal VBUS different from the bus signal VBUS initially made available by the electronic bus 3, if the feeding current IL provided by the corresponding battery module 10 is, for any reason (for example due to variations in impedance of the cells 11), lower than the minimum feeding current value made available by the electronic bus 3.

In practice, the electronic stage 21 is configured so as to provide a bus signal VBUS indicative of a new minimum feeding current value, in the case in which the feeding current IL provided by the corresponding battery module 10 has become the minimum feeding current provided to the electric load, i.e., is lower than the current value initially made available by the electronic bus 3 and, therefore, lower than the feeding current provided by part of the other battery modules of the apparatus 100.

Preferably, each electronic adjusting unit 2 comprises a second electronic stage 22 configured so as to receive and process the bus signal VBUS and the detection signal S1 and to provide a first control signal A based on the behaviour of the aforesaid signals.

Preferably, each electronic adjusting unit 2 comprises a third electronic stage 23 arranged so as to receive the control signal A and to provide, when enabled by the control signal A, a second control signal R.

Preferably, each electronic adjusting unit 2 comprises a fourth electronic stage 24 having terminals 241, 242 electrically connected to the electric line that connects the cells 11 to the electric load so that the feeding current IL provided to the electric load by the cells 11 of the corresponding battery module 10 flows through them.

The electronic stage 24 is adapted to adjust the feeding current IL, when it receives the control signal R from the electronic stage 23.

In particular, the electronic stage 24 is configured so as to reduce the feeding current IL in response to an input control signal R possibly received from the electronic stage 23.

In some embodiments of the invention, the electronic stage 24, although part of the electronic adjusting unit 2, can be used also for other purposes with respect to the purpose illustrated above.

For example, it can be intended also to act as electronic decoupling circuit to disconnect the corresponding battery module 10 from the electric load during charging of the respective cells 11 or in the event of an electrical fault.

According to a further example, the electronic stage 24 can be intended to act as protective electronic circuit to disconnect the corresponding battery module 10 from the electric load in the event of over-voltages on the electric load.

In the cases illustrated, the electronic stage 24 can receive further control signals also from other devices of the battery module 10 (for example, from the electronic control device 12) to control operation thereof in the absence of the control signal R.

Figure 2:
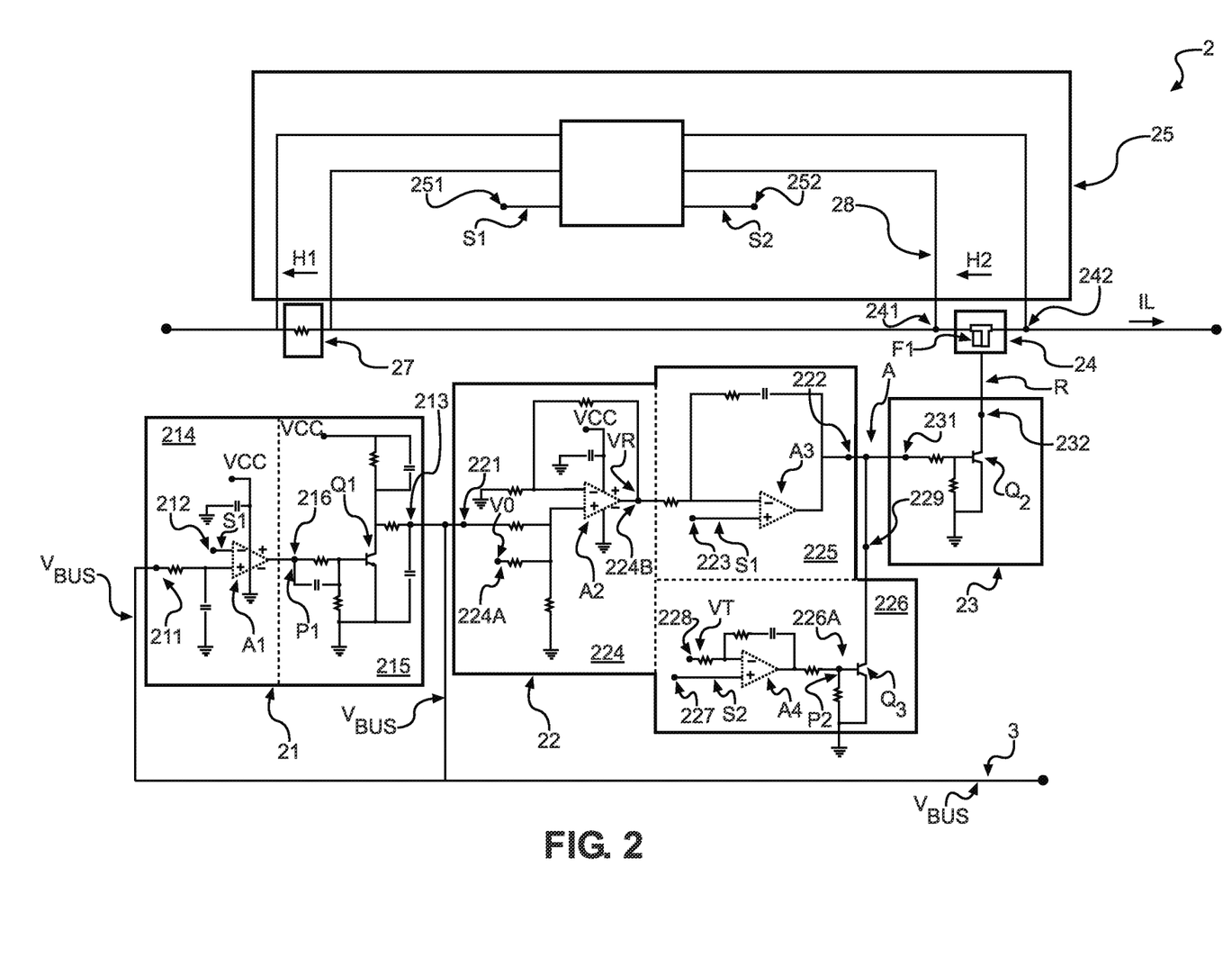
FIG. 2 schematically illustrates an electronic adjusting device according to the present invention, in a preferred embodiment.

In some embodiments of the invention, as illustrated in FIG. 2, the electronic stage 22 is arranged so as to receive a second detection signal S2 indicative of the voltage at the ends of the electronic stage 24, i.e., along the electric line that connects the cells 11 to the electric load, at the terminals 241, 242 through which the feeding current IL provided to the electric load by the cells 11 of the corresponding battery module 10 flows.

Preferably, the electronic stage 22 is configured so as to provide the control signal A based on the behaviour of the detection signal S2.

Preferably, each electronic adjusting unit 2 comprises a fifth electronic stage 25 arranged so as receive a first measuring signal M1 of the feeding current IL provided to the electric load by the cells 11.

Preferably, the electronic stage 25 is configured so as to provide the detection signal S1, obtained as a function of the measuring signal M1, at an output terminal 251.

Preferably, the electronic stage 25 is arranged so as to receive a second measuring signal M2 of the voltage at the ends of the electronic stage 24, i.e., at the terminals 241, 242.

Preferably, the electronic stage 25 is configured so as to provide the detection signal S2, obtained as a function of the measuring signal M2, at an output terminal 252.

Preferably, the electronic stage 25 comprises one or more amplification circuits configured, according to known design techniques, so as to process the measuring signals M1, M2 and to provide the detection signals S1, S2 (preferably in voltage) at the respective output terminals 251, 252.

Preferably, the electronic stage 25 receives the measuring signal M1 from a first measuring circuit 27 configured to detect the feeding current IL, along the electric line that connects the cells 11 and the electric load, and to generate the measuring signal M1.

The measuring circuit 27 can comprise, for example, a resistive shunt arranged along the electric line that connects the cells 11 and the electric load so as to provide a voltage signal M1 indicative of the feeding current IL.

Preferably, the electronic stage 25 receives the measuring signal M2 from a second measuring circuit 28 configured to detect the electric voltage between the terminals 241, 242 of the electronic stage 24 and to generate the measuring signal M2.

The measuring circuit 28 can, for example, comprise a pair of electrodes connected to the terminals 241, 242, along the electric line that connects the cells 11 and the electric load, so as to provide a voltage signal M2 indicative of the voltage between the terminals 241, 242 of the electronic stage 24.

According to some embodiments of the invention, illustrated for example in the cited figures, the measuring circuits 27, 28, although part of the electronic unit 2, can also be used for other purposes (for example as passive protection from over-currents or over-voltages) or also to send the measuring signals M1, M2 to other electronic devices of the battery module 10, for example to the electronic device 12.

According to preferred embodiments of the invention, the electronic device 1 (in particular the electronic bus 3 and the electronic adjusting units 2) is formed of electronic circuits of analog type so as to ensure reduced response times (in the order of 10-50 ms) in adjusting the feeding current IL.

According to preferred embodiments of the invention (illustrated in the cited figures), the electronic bus 3 and the electronic adjusting units 2 are arranged so that the bus signal VBUS, the detection signals S1, S2 and, more generally, the input/output signals to the electronic stages 21-25 are electric voltage signals. This makes it possible to simplify the circuit structure of the electronic device 1, in particular of the electronic adjusting units 2.

Hereunder, with reference to FIG. 2, a preferred embodiment of the invention will be described in greater detail.

Preferably, as illustrated in the cited figures, the electronic stage 21 comprises a first input terminal 211, a second input terminal 212 and a first output terminal 213.

Preferably, the input terminal 211 is connected to the electronic bus 3 to receive the bus signal VBUS (voltage) made available by this latter, the input terminal 212 is connected to the electronic stage 25 (at the terminal 251 of this latter) to receive the detection signal S1 (voltage) and the output terminal 213 is connected to the electronic bus 3 and to the electronic stage 22 to provide, if necessary, a new bus signal VBUS (voltage) to the electronic bus 3 and to the electronic stage 22.

Preferably, the electronic stage 21 comprises a first circuit section 214 having the terminals 211, 212 as input terminals and a first connection terminal 216 as output terminal.

Preferably, the circuit section 214 is configured to compare the bus signal VBUS, made available by the electronic bus 3, and the detection signal S1 with each other.

Preferably, the circuit section 214 comprises a first operational amplifier A1 arranged in configuration of unit gain amplifier and provided with suitable input and output electric power networks (which can be produced with known design techniques) advantageously configured so as to allow the amplifier to absorb current to ground and not to supply output current.

The operational amplifier A1 is advantageously arranged so as to have the non-inverting and inverting inputs connected respectively to the input terminals 211, 212 and the output connected with the connection terminal 216.

The circuit section 214 provides, at the connection terminal 216, a first control signal P1 (voltage) that assumes a "high" or "low" logic state respectively in the cases in which the detection signal S1 is lower or higher than the bus signal VBUS.

Preferably, the electronic stage 21 comprises a second circuit section 215 connected in cascade with the circuit section 214.

Preferably, the circuit section 215 has the connection terminal 216 as input terminal and the terminal 213 as output terminal.

Preferably, the circuit section 215 is configured to provide a signal indicative of the feeding current IL provided to the electric load by the corresponding battery module 10 in the case in which the detection signal S1 is lower than the input bus signal VBUS received.

If the feeding current IL value, provided by the cells 11 of the corresponding battery module 10, is lower than the current value (minimum feeding current) of the bus signal VBUS, the output signal (voltage) provided by the circuit section 215 will be indicative of a new minimum feeding current value provided to the electric load.

Given that the output terminal 213 is connected to the electronic bus 3, the output signal provided by the circuit section 215 will form a new bus signal VBUS to be made available to the electronic units 2 through the electronic bus 3.

Preferably, the circuit section 215 is configured not to provide any output signal in the case in which the feeding current IL value, provided by the cells 11 of the corresponding battery module 10, is higher than the current value (minimum feeding current) of the bus signal VBUS made available by the electronic bus 3.

Preferably, the circuit section 215 comprises a first switching device Q1 (preferably a transistor of BJT type) arranged, through a suitable filter and polarization network that can be produced with known design techniques, so as to have the terminals (in the example illustrated base, collector and emitter) connected respectively to the terminals 216, 213 and to ground.

In this way, if the control signal P1 at the terminal 216, is in a "low" or "high" logic state, the switching device Q1 is in an off-state (OFF) or on-state (ON), respectively.

The operation of the electronic stage 21, according to the embodiment illustrated above, will now be described in greater detail.

The circuit section 214 receives the bus signal VBUS and the detection signal S1 and performs a comparison between them.

If the current value provided by the detection signal S1 is higher than the current value provided by the bus signal VBUS, the operational amplifier A1 provides, with a response dynamic that depends on the related feedback network, a control signal P1 (voltage) having a "low" logic value at the connection terminal 216.

In this case, the transistor Q1 of the circuit section 215 is taken to an off-state (OFF) with a response dynamic that depends on the related polarization and filter network.

Therefore, the electronic stage 21 is not able to provide any output signal at the terminal 213. The bus signal VBUS, made available by the electric bus 3 and imposed by the electronic adjusting unit of another battery module of the apparatus 100 that provides the minimum feeding current to the electric load, is not modified by the electronic stage 21.

If the current value provided by the detection signal S1 is lower than the current value provided by the bus signal VBUS, the operational amplifier A1 provides, with a response dynamic that depends on the related feedback network, a control signal P1 (voltage) having a"high" logic value.

In this case, the transistor Q1 of the circuit section 215 is taken to an on-state (ON) with a response dynamic that depends on the related polarization and filter network.

After a short transient period, the electronic stage 21 is able to provide, at the terminal 213, an output signal (voltage) indicative of the feeding current IL value supplied to the electric load by the battery module 10.

This output signal (in this case corresponding to the detection signal S1) forms a new bus signal VBUS that is imposed on the electric bus 3. This is made possible by the fact that the other electronic adjusting units 2, connected to the electronic bus 3, are not able to provide any bus signal given that the feeding current IL, supplied by the battery module 10, is the minimum feeding current provided to the electric load.

The arrangement of the electronic stage 21 in the electronic units 2 makes it possible to considerably simplify the overall structure of the adjusting device 1 and of the apparatus 100, according to the invention.

In fact, unlike what occurs in prior art storing apparatus, it is not necessary to arrange an electronic control unit that acts as "master" device to send reference signals to the adjusting units on the battery modules.

In the electronic device 1, according to the invention, the bus signal VBUS, in a given instant of operation, is imposed, automatically, by the electronic stage 21 of the battery module 10 that supplies the minimum feeding current to the electric load.

Each electronic adjusting unit 2 can therefore automatically become, in relation to the operating state of the cells of the corresponding battery module, a "master" device for the electronic adjusting units of the other battery modules or a "slave" device controlled by the electronic adjusting unit of another battery module.

Preferably, the electronic stage 22 is connected to the electronic bus 3 and in cascade with the electronic stage 21 and is connected to the electronic stage 23 to provide this latter with the control signal A.

Preferably, the electronic stage 22 comprises a third circuit section 224 adapted to receive the bus signal VBUS and to provide a reference signal VR as a function of the bus signal VBUS. Preferably, the reference signal VR is a voltage signal defined by the relation VR=VO+VBUS, where VO is a predefined offset signal (voltage).

Preferably, the circuit section 224 comprises a third input terminal 221 of the electronic stage 22 connected to the output terminal 213 of the electronic stage 21 and to the electronic bus 3 to receive the bus signal VBUS made available by this latter or directly by the electronic stage 21.

Preferably, the circuit section 224 comprises a fourth input terminal 224A of the electronic stage 22 connected to a feeding circuit (not illustrated) to receive the offset signal VO. Preferably, the circuit section 224 comprises a second connection terminal 224B at which to provide the reference signal VR.

Preferably, the circuit section 224 comprises a second operational amplifier A2 arranged, through a suitable feedback electric power network that can be produced with known design techniques, in configuration of non-inverting summing amplifier.

The operational amplifier A2 is advantageously arranged so as to have, through the aforesaid feedback network, the non-inverting input connected to the input terminals 221 and 224A, the inverting input connected to ground and output connected to the connection terminal 224B. Being in configuration of non-inverting summing amplifier, the operational amplifier A2 provides an output reference signal (voltage) VR=VO+VBUS.

In practice, the circuit section 224 is configured to sum a predefined offset value (voltage) to the value (voltage) of the input bus signal VBUS received. This offset value VO can be, for example, about 2% of the maximum value of the signal VBUS.

The circuit section 224 advantageously makes it possible to reduce the influence of any disturbances superimposed on the bus signal VBUS making adjustment of the feeding current IL provided by the battery module 10 much more robust, in relation to negligible measurement errors (for example lower than 4% of the maximum value).

Preferably, the electronic stage 22 comprises a fourth circuit section 225 connected in cascade with the circuit section 224.

Preferably, the circuit section 225 has the connection terminal 224B as input terminal and comprises a fifth input terminal 223 of the electronic stage 22 connected to the electronic stage 25 (at the terminal 251 of this latter) to receive the detection signal S1 (voltage).

Preferably, the circuit section 225 comprises a second output terminal 222 of the electronic stage 22 at which there is provided the control signal A for the electronic stage 23.

Preferably, the circuit section 225 comprises a third operational amplifier A3 arranged in configuration of proportional-integrator, through a suitable feedback electric power network that can be produced with known design techniques.

The operational amplifier A3 is advantageously arranged so as to have, through the aforesaid feedback network, the non-inverting and inverting inputs connected respectively to the input terminals 223, 224B and the output connected with the output terminal 222.

When the reference signal S1 (voltage) is lower than the reference signal VR, i.e., when the feeding current IL value supplied by the battery module 10 is lower than the reference value VR (indicative of the minimum feeding current value added to the offset value), the operational amplifier A3 provides an output signal (voltage) that progressively decreases as a function of the difference between the input signals S1, VR.

When the reference signal S1 is higher than the reference signal VR, i.e., when the feeding current IL value supplied by the cells 11 is higher than the reference value VR, the operational amplifier A3 provides an output signal (voltage) that increases progressively as a function of the difference between the input signals S1, VR.

The circuit section 225 thus provides, at the output terminal 222, a control signal A that varies as a function of the difference between the feeding current IL value supplied by the cells 11 and the reference value VR.

Preferably, the electronic stage 23 is connected in cascade with the electronic stage 22 and is connected to the electronic stage 24 to provide this latter with the control signal R, when enabled by the input control signal A received by the electronic stage 22.

Preferably, the electronic stage 23 comprises a sixth input terminal 231 connected to the output terminal 222 of the electronic stage 22 and a third output terminal 232 connected to the electronic stage 24.

Preferably, the electronic stage 23 comprises a second switching device Q2 (preferably a transistor of BJT type) arranged, through a suitable filter and polarization network that can be produced with known design techniques, so as to have the terminals (in the example illustrated base, collector and emitter) connected respectively to the terminals 231, 232 and to ground.

In this way, if the control signal A, at the terminal 231, is in a "low" or "high" logic state, the switching device Q2 is in off-state (OFF) or on-state (ON), respectively.

Preferably, the electronic stage 24 comprises a third switching device F1 (preferably of FET type) arranged, through a suitable filter and polarization network that can be produced with known design techniques, so as to have a pair of terminals (in the example illustrated the "source" and "drain" terminals) connected with the terminals 241, 242, so that the feeding current IL flows through them, and a further terminal (in the example illustrated the "gate" terminal) connected to the terminal 232 of the electronic stage 23.

The switching device F1 is advantageously arranged so as to operate constantly in saturation state. It can thus adjust the feeding current IL, in the example illustrated flowing between the "source" and "drain" terminals, as a function of an input control voltage, in the example illustrated the voltage between the "gate" and "source" terminals.

When the control signal A is in "low" logic state, the switching device Q2 is in an off-state and the electronic stage 23 is unable to provide any second control signal R at the terminal 232. The terminal 232 can, for example, remain at the potential imposed by another electronic circuit connected thereto, for example by the electronic control device 12.

Therefore, the electronic stage 23 is not able to interact with the electronic stage 24 to adjust the feeding current IL.

When the control signal A is in "high" logic state, the switching device Q2 is in an on-state and the electronic stage 23 provides the control signal R (voltage) at the terminal 232.

This control signal R consists substantially in imposing on the terminal 232 a control voltage having a value lower than the voltage that would have been imposed by another electronic circuit connected to the same terminal 232, for example the control device 12.

When the terminal 232 is held at an increasingly lower voltage, the "gate-source" voltage of the transistor F1 decreases progressively with consequent progressive reduction of the feeding current IL flowing across the terminals 241, 242 (increase of the equivalent resistance of the transistor F1).

It is pointed out that when the terminal 232 is held at a gradually decreasing voltage, the voltage between the terminals 241, 242 (in the example illustrated the "drain" and "source" terminals of the transistor F1) of the electronic stage 24 increases progressively, given that the reduction of the feeding current IL flowing through the transistor F1 is obtained at the expense of an increase in the equivalent resistance of this latter.

From the above, it is evident that the electronic unit 2 (in particular the electronic stage 25, the circuit sections 224-225, the electronic stage 23 and the electronic stage 24) implements a first control loop that adjusts the feeding current IL as a function of the bus signal VBUS.

More specifically, this control loop is configured so as to reduce the feeding current IL provided to the electric load by the cells 11, when the value of this latter exceeds the minimum feeding current value provided by the signal VBUS.

The adjusting action, performed by the aforesaid first control loop, stabilizes when the feeding current IL value provided to the electric load by the cells 11 is more or less equal (except for an error introduced by the offset voltage VO) to the minimum feeding current value provided by the signal VBUS.

In the case in which, in a given instant, the feeding current IL value provided to the electric load by the cells 11 is, for any reason, lower than the minimum feeding current value provided by the signal VBUS, the aforesaid first control loop does not provide any adjusting action (electronic stage 23 in an off-state). In fact, in this circumstance the feeding current IL provided by the cells 11 is the minimum feeding current supplied to the electric load.

According to some embodiments of the invention (illustrated in the cited figures), the electronic stage 22 comprises a fifth circuit section 226.

Preferably, the circuit section 226 comprises a seventh input terminal 227 of the electronic stage 22 connected to the electronic stage 25 (at the terminal 252 of this latter) to receive the detection signal S2 (voltage).

Preferably, the circuit section 226 comprises an eighth input terminal 228 of the electronic stage 22 connected to a supply circuit (not illustrated) to receive a threshold signal VT (voltage).

Preferably, the circuit section 226 comprises a third connection terminal 229 connected to the output terminal 222, at which the control signal A for the electronic stage 23 is provided.

Preferably, the circuit section 226 is configured to receive the detection signal S2 and to provide, as a function of the detection signal S2 and in substitution of the fourth circuit section 225, the electronic stage 23 with a control signal A having a predefined value such as to disable the electronic stage 23.

Preferably, the circuit section 226 comprises a fourth operational amplifier A4 arranged in configuration of proportional-integrator, through a suitable feedback electric power network that can be produced with known design techniques.

The operational amplifier A4 is advantageously arranged so as to have, through the aforesaid feedback network, the non-inverting and inverting inputs respectively connected to the input terminals 228, 227 and the output connected with a fourth connection terminal 226A.

The operational amplifier A4 provides, at the terminal 226A, a second control signal P2 (voltage) that varies as a function of the difference between the detection signal S2 and the threshold signal VT.

When the reference signal S2 (voltage) is lower than the threshold signal VT, i.e., when the voltage between the terminals 241, 242 of the electronic stage 24 (in the example illustrated above, the "drain-source" voltage of the transistor F1) is lower than the threshold value VT, the operational amplifier A4 provides an output control signal P2 that decreases progressively as a function of the difference between the input signals S1 and VT.

When the reference signal S2 is higher than the threshold signal VT, i.e., when the voltage between the terminals 241, 242 of the electronic stage 24 is higher than the threshold value VT, the operational amplifier A4 provides an output signal that increases progressively as a function of the difference between the input signals S1, VT.

Preferably, the circuit section 226 comprises a third switching device Q3 (preferably a transistor of BJT type) arranged, through a suitable filter and polarization network that can be produced with known design techniques, so as to have the terminals (in the example illustrated base, collector and emitter, respectively) connected respectively to the terminals 226A, 229 and to ground.

In this way, if the control signal P2, at the terminal 226, is in a "low" or "high" logic state, the switching device Q3 is in an off-state (OFF) or on-state (ON), respectively.

The operation of the circuit section 227 is now described in greater detail.

The circuit section 226 receives the detection signal S2 and the threshold signal VT and performs a comparison between them.

If the value indicative of the voltage between the terminals 241, 242 of the electronic stage 24 is lower than the threshold value VT, the operational amplifier A4 provides, with response dynamics that depend on the related feedback network, an output control signal P2 that decreases progressively until the transistor Q3 is taken to an off-state (OFF).

Therefore, the circuit section 226 is notable to provide any output signal at the terminal 229 and hence to interact with the circuit section 225.

If the value indicative of the voltage between the terminals 241, 242 of the electronic stage 24 is higher than the threshold value VT, the operational amplifier A4 provides an output control signal P2 (voltage) that increases progressively until the transistor Q3 is taken to an on-state (ON).

When the transistor Q3 is in an on-state, the connection terminal 229 necessarily assumes a predefined voltage that is also imposed on the output terminal 222 of the circuit section 225, given that this latter is connected to the terminal 229.

The above substantially means that a control signal A having a predefined value is provided at the output terminal 222 of the electronic stage 22.

It is pointed out that when the circuit section 226 operates (transistor Q3 in on-state), the control signal A assumes the aforesaid predefined value, regardless of the adjusting action performed by the circuit section 225.

Therefore, the circuit section 226 substitutes the circuit section 225 in providing the control signal A to the electronic stage 23, when the voltage between the terminals 241, 242 of the electronic stage 24 is higher than the threshold value VT.

From the above it is evident that the electronic stage 25 and the circuit section 226 implement a second voltage control loop that operates only when the voltage between the terminals 241, 242 of the electronic stage 24 is higher than the threshold value VT.

The aforesaid second control loop substantially maintains the voltage between the terminals 241, 242 of the electronic stage 24 at the value VT and makes the action of the first control loop (illustrated above) ineffective, when the voltage between the terminals 241, 242 of the electronic stage 24 tends to exceed the threshold value VT.

The action of the aforesaid second control loop causes a reduction of the voltage between the terminals 241, 242 of the electronic stage 24, given that the equivalent resistance offered by this latter decreases.

Figure 3:
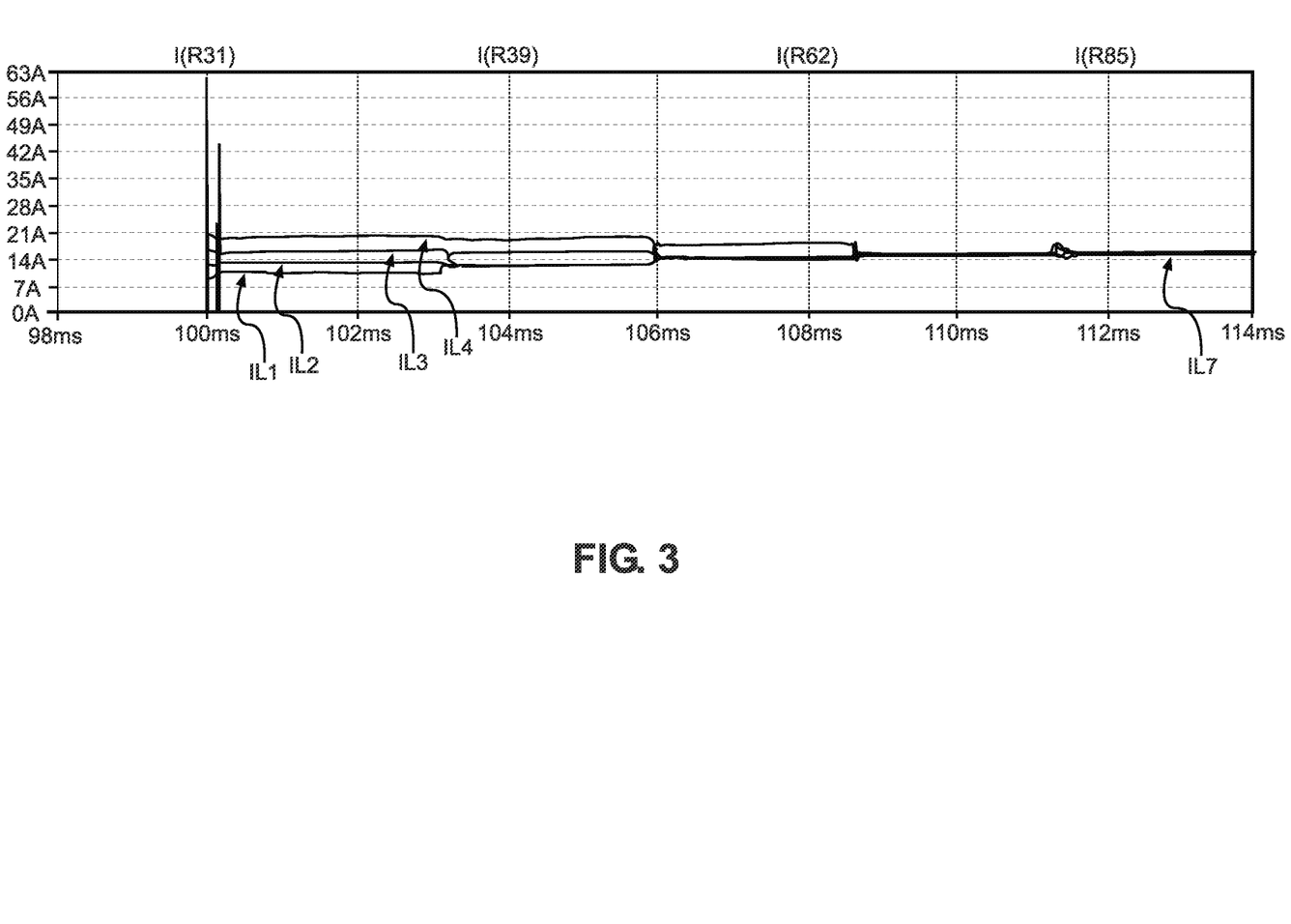
FIG. 3 schematically illustrates the operation of an example of electric energy storing apparatus with batteries comprising an electronic adjusting device according to the present invention.

With reference to FIG. 3, there is illustrated an example of operation of an electric energy storing apparatus 100, according to the present invention, comprising four battery modules 10 connected in parallel to the load.

Initially, the battery modules 10 provide feeding currents having values IL1, IL2, IL3, IL4 very different to one another.

As can be seen, as a result of the action of the adjusting device 1, the feeding currents provided by the battery modules rapidly reach (in around 9 ms) a common value ILM corresponding approximately to the mean value of the initial currents (with a maximum error lower than 1%).

It has been found in practice how with the storing apparatus 100 and the related electronic adjusting device 1, according to the invention, the foregoing objects can be attained.

The adjusting device 1 allows very rapid balancing of the feeding currents provided to the electric load ensuring effective equal sharing of the load among the various battery modules. The adjusting device 1 is capable of automatically adapting the balancing action of the feeding currents provided to the electric load to the effective operating conditions of the battery modules, in particular of the cells of these latter.

The adjusting device 1 has a relatively simple circuit structure and can be easily arranged on an electric energy storing apparatus, without any appreciable increase in the overall dimensions thereof.

The adjusting device 1 and the apparatus 100 are easy and inexpensive to manufacture on an industrial scale.

SEQUENCE LISTING

Not Applicable

What is claimed is:

1. An electronic adjusting device for an electric energy storing apparatus of the type provided with batteries, said storing apparatus comprising:

a plurality of battery modules electrically connectable with an electric load, said electronic adjusting device comprising a plurality of electronic adjusting units, each comprised in a corresponding battery module to adjust a feeding current provided to said electric load by one or more cells of the corresponding battery module, characterized in that it comprises an electronic bus connected to said electronic adjusting units to make available a bus signal to said electronic adjusting units, which is indicative of a minimum feeding current provided to said electric load, each electronic adjusting unit comprising a first electronic stage adapted to receive and process the bus signal made available by said electronic bus and a first detection signal indicative of the feeding current provided by the cells of the corresponding battery module to said electric load, said first electronic stage being adapted to provide a new modified bus signal to be made available to said adjusting electronic units through said electronic bus, in the case in which the feeding current provided to said electric load by the cells of the corresponding battery module is lower than said minimum feeding current.

2. The electronic adjusting device, according to claim 1, characterized in that each electronic adjusting unit comprises a second electronic stage adapted to receive and process said bus signal and said first detection signal and to provide a first control signal based on the behavior of said bus signal and first detection signal.

3. The electronic adjusting device, according to claim 2, characterized in that each electronic adjusting unit comprises a third electronic stage adapted to receive said first control signal and to provide, when enabled by said first control signal, a second control signal to reduce the feeding current provided to said electric load by the cells of the corresponding battery module.

4. The electronic adjusting device, according to claim 3, characterized in that each electronic adjusting unit comprises a fourth electronic stage adapted to reduce the feeding current provided to said electric load by the cells of the corresponding battery module, when said fourth electronic stage receives said second control signal from said third electronic stage.

5. The electronic adjusting device, according to claim 4, characterized in that said second electronic stage is adapted to receive and process a second detection signal indicative of the voltage at the terminals of said fourth electronic stage, through which the feeding current provided to said electric load by the cells of the corresponding battery module flows, and to provide said first control signal based on the behavior of said second detection signal.

6. The electronic adjusting device, according to claim 5, characterized in that said first electronic stage comprises:
a first circuit section adapted to compare said new modified bus signal and said first detection signal; and
a second circuit section adapted to provide said new modified bus signal.

7. The electronic adjusting device, according to claim 6, characterized in that said second electronic stage comprises:
a third circuit section adapted to receive and process said bus signal and to provide a reference signal based on said bus signal; and
a fourth circuit section adapted to receive and process said reference signal and said first detection signal and to provide said first control signal based on said reference signal and said first detection signal.

8. The electronic adjusting device, according to claim 7, characterized in that said second electronic stage comprises a fifth circuit section adapted to receive and process said second detection signal and to provide, based on said second detection signal and in substitution of said fourth circuit section, said first control signal with a predefined value to disable said third electronic stage.

9. The electronic adjusting device, according to claim 8, characterized in that it each electronic adjusting unit comprises a fifth electronic stage adapted to receive and process a first measuring signal of the feeding current provided to said electric load by the cells of the corresponding battery module and to provide said first detection signal.

10. The electronic adjusting device, according to claim 9, characterized in that said fifth electronic stage is adapted to receive and process a second measuring signal of the voltage at the terminals of said fourth electronic stage, through which the feeding current provided to said electric load by the cells of the corresponding battery module flows, and to provide said second detection signal.

11. An electric energy storing apparatus comprising a plurality of battery modules electrically connectable with an electric load, characterized in that it comprises an electronic adjusting device comprising, a plurality of electronic adjusting units, each comprised in a corresponding battery module to adjust a feeding current provided to said electric load by one or more cells of the corresponding battery module, characterized in that it comprises an electronic bus connected to said electronic adjusting units to make available a bus signal to said electronic adjusting units, which is indicative of a minimum feeding current provided to said electric load, each electronic adjusting unit comprising a first electronic stage adapted to receive and process the bus signal made available by said electronic bus and a first detection signal indicative of the feeding current provided by the cells of the corresponding battery module to said electric load, said first electronic stage being adapted to provide a new modified bus signal to be made available to said adjusting electronic units through said electronic bus, in the case in which the feeding current provided to said electric load by the cells of the corresponding battery module is lower than said minimum feeding current.

12. An electric energy storing apparatus, according to claim 11, characterized in that said battery modules comprise cells of the lithium-ion type.

* * * * *